United States Patent [19]

Garas

[11] Patent Number: 4,563,064
[45] Date of Patent: Jan. 7, 1986

[54] CONICAL FIELD-OF-VIEW RADAR TRANSMITTER SYSTEM

[75] Inventor: Anthony G. Garas, Phoenix, Ariz.

[73] Assignee: Motorola, Inc., Schaumburg, Ill.

[21] Appl. No.: 403,392

[22] Filed: Jul. 30, 1982

[51] Int. Cl.$^4$ .......................... G02B 17/06; G02B 5/10; H01Q 19/18
[52] U.S. Cl. .................................. 350/620; 343/781 P
[58] Field of Search .................... 350/294; 343/781 P, 343/781 CA, 837, 425; 356/152

[56] References Cited

U.S. PATENT DOCUMENTS

| | | | |
|---|---|---|---|
| 3,917,381 | 11/1975 | Feigin | 350/294 |
| 4,265,510 | 5/1981 | Cook | 350/294 |
| 4,343,004 | 8/1982 | Ohm | 343/781 P |
| 4,357,075 | 11/1982 | Hunter | 350/294 |

Primary Examiner—Jon W. Henry
Attorney, Agent, or Firm—Eugene A. Parsons

[57] ABSTRACT

A system for providing a far field shell-like conic pattern utilizing four quadrant oriented reflective optical assemblies. The pattern from each assembly covers one quadrant sector of the pattern and provides a shell having a thickness on the order of one degree.

8 Claims, 13 Drawing Figures

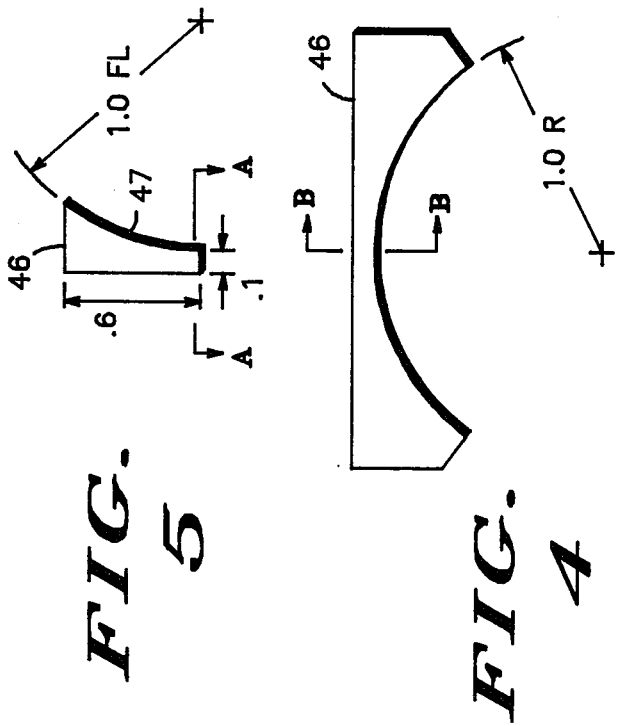
FIG. 2
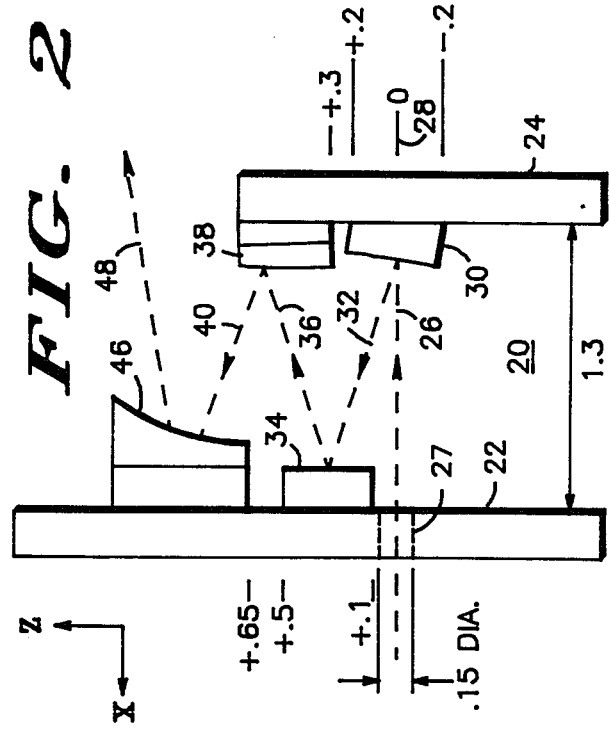
FIG. 5
FIG. 4
FIG. 3
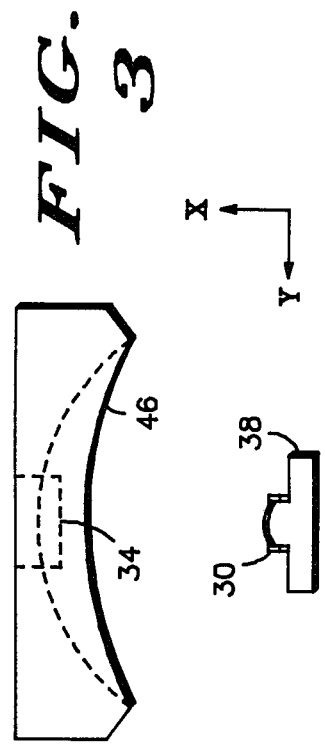
FIG. 7

CONICAL FIELD-OF-VIEW RADAR TRANSMITTER SYSTEM

BACKGROUND OF THE INVENTION

Optical radar system transmitters may have need for a transmitter antenna pattern which is shell-like so that the effective field-of-view is within a very small $\Delta\theta$ range offset in the range of from zero to 90 degrees from a central axis. In such systems it is desirable for the nominal angle of the shell-like pattern off the central axis to be a constant. However, no such systems are known to be in the prior art.

Applicant has, however, become aware of a shell-like optical pattern system which was developed concurrently with the instant invention. It differs from applicant's invention in that a cross section of the pattern of the concurrent art is rectangular in shape. This configuration complicates range determinations since the off-axis angle changes with the target direction.

SUMMARY OF THE INVENTION

The present invention reduces the complexity of making range determinations by providing a shell-like conic pattern for the transmitted output of the radar system. This shell-like conic pattern results from a constant nominal off-central-axis angle of illumination regardless of target direction.

It is, therefore, an object of the instant invention to provide a conical shell-like pattern for an optical radar transmitter system.

It is another object of the instant invention to provide a shell-like conical pattern for an optical radar system which is derived from a small and compact optical system.

It is yet another object of the instant invention to provide a conical shell-like antenna pattern for an optical radar transmitter by providing for quadrature optical arrays to complete the cone. These and other objects of the instant invention will become more readily understood upon review of the detailed description below taken together with the figures in which:

FIG. 2 is an on-center cross-sectional side view of the one-quadrant optics of the invention;

FIG. 3 is a top view of the optics of FIG. 2;

FIG. 4 is a detailed cross sectional top view of optical element 46 of FIG. 2 taken through section A—A of FIG. 5;

FIG. 5 is a detailed cross-sectional side view of optical element 46 of FIG. 2 taken through section B—B of FIG. 4;

FIG. 7 is a detailed cross-sectional side view of optical element 38 of FIG. 2 taken through section D—D of FIG. 6;

DETAILED DESCRIPTION OF THE INVENTION

Figure 1:
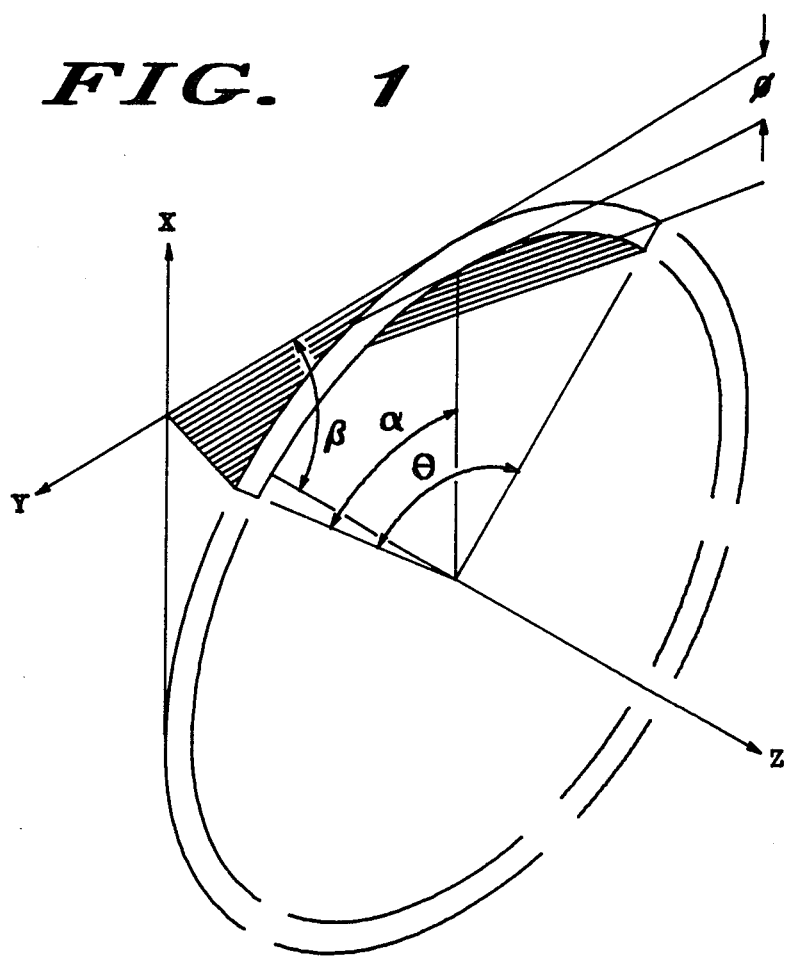
FIG. 1 is an isometric view of the general case conical field-of-view pattern provided by the optics of FIG. 2.

The optical system of the invention illuminates a pattern such as is shown in FIG. 1, in a general way. While it will be shown, infra, that more than one set of optical elements may be combined in a configuration which provides 360 degree coverage, FIG. 1 is limited to the quadrant illuminated by one such set of elements. The conic segment illuminated by such an assembly of optical elements is shown as angle $\theta$. The axis of a flight path of a vehicle which might carry the transmitter of the invention may coincide with axis Z. The roll angle of the vehicle which might be oriented along a flight path such as Z is shown as the angle $\alpha$. The conic half angle is shown as angle $\beta$. It should be noted that not all of the cone is illuminated, but rather the illumination is limited to a shell-like volume along the conical surface. This shell-like area has a thickness which varies according to the distance from the origin XYZ according to a divergence angle $\phi$, which is shown.

Figure 13:
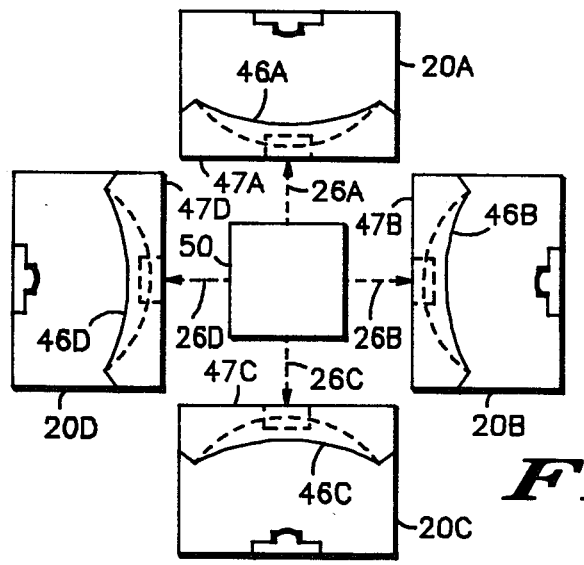
FIG. 13 shows an assembly of four of the optical group shown in FIG. 2.

FIG. 2 illustrates the optical system of the invention. It is a sectional view of the optics taken in the plane XZ of FIG. 1. The input to the optical system is a narrowly diverging Gaussian TEM$_{OO}$ beam 26 such as may be generated by a gas or solid state laser using a confocal or wave guide resonant cavity. The optical system of FIG. 2 transforms the Gaussian distribution of the input beam into a 90 to 100 degree section of a true conical-shell beam. Full 360 degree conical-shell beam coverage may be accomplished by the use of four identical transmitter optical systems 20 such as shown in FIG. 13. The generic design allows the nominal conic half-angle to be selected in the range of from approximately 15 to 90 degrees. The half-conic angle referred to here is $\beta$ in FIG. 1. The input beam 26 impinges cylindrical mirror element 30, nominally, at its center. Element 30 is reflective as are all of the other elements of the system. The all reflective design allows the optical system to operate with laser sources ranging from the visible through the far infrared, and provides for low cost fabrication and testing in volume production. The system according to FIG. 2 illustrates the optical system configuration optimized for a 75 degree conic half angle, $\beta$. Input pencil beam 26 enters the system via a 0.150 inch diameter aperture 27 through support member 22 before being reflected from off-axis cylinder reflector 30. Flat mirror element 34 folds the optical path and the beam forms a real line image on the surface of element 38, an off-axis spherical toric segment. The line image on the surface of element 38 forms an object for parabolic toric reflector 46. At the desired conic half angle, the position of the line image on mirror 46 and the off-axis tilt of the parabolic toric reflector 30 can be adjusted so that the far field pattern will range from a hyperboloid through a paraboloid. Thus a true circular curvature at the desired conic half angle can be achieved within this range of adjustment. In addition to input ray 26, rays 32, 36, 40 and 48 appear in FIG. 2 and represent the reflections of the beam through the system. Element 38 may be adjusted in the Z axis direction and element 46 may be adjusted by tilting it in the XZ plane in order to attain the desired far field pattern. A top view of the assembly of FIG. 2 is shown in FIG. 3. Like reference numerals are utilized in FIG. 3, as in all the Figures, where the elements are identical. Supporting members 22 and 24 of FIG. 2, which are parallel mounting surfaces, are omitted from FIG. 3 for clarity. The optical design is compact needing a packaging volume of less than 2×2×1½ inches and is sufficiently rugged to withstand severe vibration in shock environments. The individual optical elements of the invention are defined in more detail in FIGS. 4 through 10.

FIGS. 4 and 5 show optical element 46 in detail. Element 46 is shown as a section A—A of FIG. 5. FIG. 5, in turn, is a section of FIG. 4 taken at B—B. Element 46 has a surface which is formed by the cross section of FIG. 5 being rotated through a circle of revolution equal to one inch as shown in FIG. 4. It is 0.6 inches high, 0.1 inches thick at the base (at section A—A) and has a surface 47 which is a portion of a parabola with a one-inch focal length as shown in FIG. 5. This provides a focal point which is in line with the base and centered thereon. Coincidentally, the radius of revolution centers at the same point as shown in FIG. 4.

Figure 6:
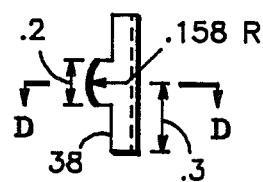
FIG. 6 is a detailed cross-sectional top view of optical element 38 of FIG. 2 taken through section C—C of FIG. 7.

FIGS. 6 and 7 illustrate in more detail spherical toric mirror 38. Mirror 38 is 0.2 inches wide and the base is 0.6 inch wide (but this is a designer's choice; it can be any desired width) as shown in FIG. 6. Mirror 38 has a horizontal radius of 0.158 inches, again as shown in FIG. 6. The vertical height is 0.40 inches as shown in FIG. 7. The total thickness at the base is 0.20 inches and the radius of curvature of the reflective surface in the vertical direction is 2.182 inches with a center located 0.10 inches above the base. The back face is cut with a three degree vertical angle. All of this is as shown in FIG. 7. FIG. 6 is a top view taken through plane C—C of FIG. 7 and FIG. 7 is a cross sectional side view taken at section D—D of FIG. 6. It should be noted that the three degree angle back surface of optical element 38 is adjacent supporting element 24 in FIG. 2 (see also FIG. 7).

Figure 9:
FIG. 9 is an edge view of optical element 34 of FIG. 8.
Figure 8:
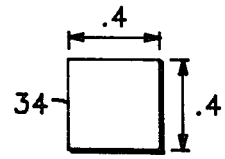
FIG. 8 is a detailed front view of optical element 34 of FIG. 2.

FIGS. 8 and 9 illustrate the front and side view, respectively, of the 0.40 inch square, 0.20 inch thick flat mirror 34.

Figure 10:
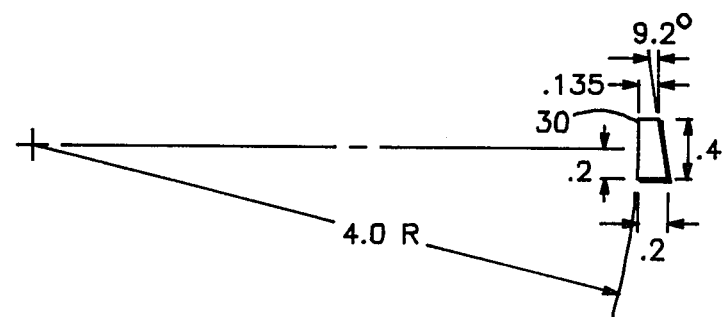
FIG. 10 is a detailed side view of optical element 30 of FIG. 2.

FIG. 10 illustrates the details of cylindrical mirror 30. The vertical front surface has a four inch radius about its center which is 0.2 inch above the base. The mirror is 0.4 inch high and 0.2 inch thick at the base. The back is cut away at a 9.2 degree angle. This provides a top width of 0.135 inches, approximately. The angled back surface is mounted on supporting member 24 as shown in FIG. 2.

Again referring to FIG. 2, note that backing or supporting plates 22 and 24 are spaced approximately 1.3 inches apart. The relative vertical spacing of the four elements which make up the optical assembly of the invention is shown in FIG. 2. Datum line 28 is arbitrarily set at 0.0 inches. Datum line 28 coincides with axis 26 of the input optical beam. It will be seen that the base of optical element 30 is at −0.2 inches from datum 28. Since lens element 30 is 0.4 inch high, the upper edge of lens element 30 is +0.2 inches above datum line 28. The lower edge of lens element 38 is +0.3 inches above datum line 28. The lower edge of flat mirror element 34 is +0.1 inches above datum line 28. Since mirror element 34 is 0.4 inches square, the upper edge of mirror element 34 is at +0.5 inches with respect to datum line 28. The lower edge of parabolic toric mirror 46 is +0.65 inches above datum line 28.

Figure 11:
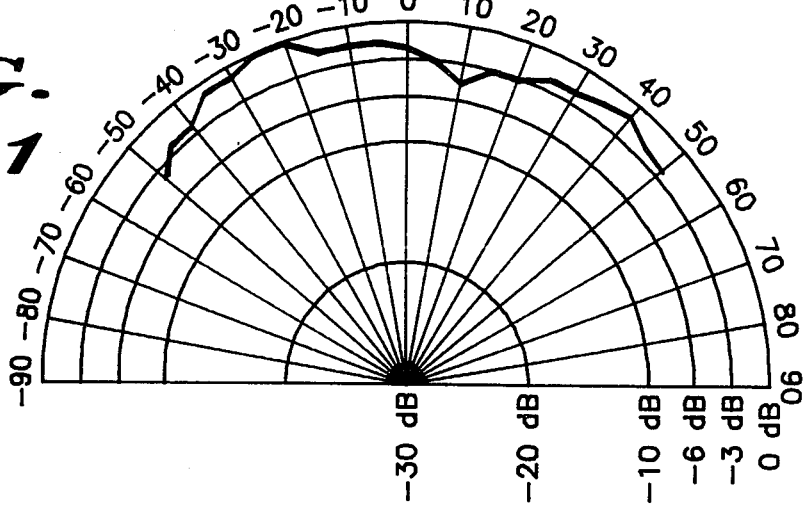
FIG. 11 is a graph of maximum polar field intensity as measured on one embodiment of the invention shown in FIG. 2.
Figure 12:
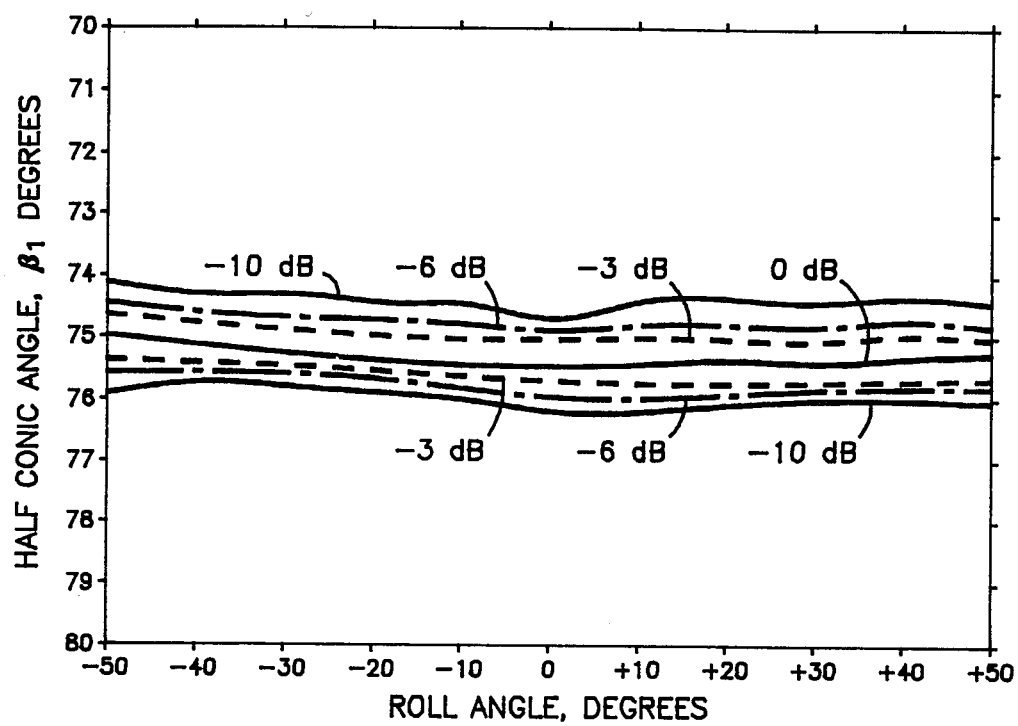
FIG. 12 is a graph of elevation response as a function of roll angle $\Delta$ and half conical angle $\beta$ for one embodiment of the invention shown in FIG. 2.

FIG. 11 shows a graph of maximum polar field intensity which has been measured on one embodiment of the invention. It may be seen that the intensity is relatively flat between −50 and +50 degrees roll angle, a 100−degree range. Within this range the intensity is flat within 5 dB as shown. FIG. 12 illustrates the shell thickness at or in the vicinity of the conic surface. Over the full roll angle of −50 to +50 degrees it may be seen that the conic half angle does not vary more than ±1 degree at the points where the intensity is down by 10 dB. The 6 dB intensity points are even narrower, as shown. The nominal conic half angle in the particular embodiment measured was approximately 75 degrees. The total shell thickness at −3 dB is less than one degree.

FIG. 13 illustrates in block form a configuration which may be used to accomplish a 360 degree roll angle coverage. Optical assemblies 20A, 20B, 20C and 20D are located in four quadrant positions. Lens elements 46A, 46B, 46C and 46D are oriented so that their backs or mounting surfaces 47A, 47B, 47C and 47D face inwardly. These optical assemblies are identical to that shown in FIGS. 2 and 3. Input rays 26A, 26B, 26C and 26D respectively correspond to input optical ray 26 in FIG. 2. Beam splitter 50 is utilized to split a single laser source (not shown) into four equal beams in quadrature orientation to feed the four optical assemblies 20A, 20B, 20C, 20D. Assembly 20A illuminates the upper quadrature of FIG. 1 whereas assembly 20C illuminates the lower quadrature as shown in FIG. 1. The left and right quadrants in FIG. 1 are illuminated by the left and right assemblies 20D and 20B respectively, as shown in FIG. 13.

The overall input to output power efficiency of the optical system of the invention has been measured at greater than 60%.

While the invention has been particularly shown and described with reference to a preferred embodiment thereof, it will be understood by those skilled in the art that various other modifications and changes may be made to the present invention from the principles of the invention described above without departing from the spirit and scope thereof, as encompassed in the accompanying claims. Therefore, it is intended in the appended claims to cover all such equivalent variations as come within the scope of the invention as described.

I claim:

1. An optical transmission assembly comprising:
   an off-axis cylindrical mirror element adapted for illumination by an optical pencil beam;
   a flat mirror element oriented to receive a first reflection of said optical pencil beam from said off-axis cylindrical mirror;
   a spherical toric mirror element oriented to receive a second reflection of said pencil beam from said flat mirror; and
   a parabolic toric mirror element oriented to receive a third reflection of said pencil beam from said spherical toric mirror element, said parabolic toric mirror producing a segment of a conic-shell optical pattern having a conic half-angle in the range of from 15 degrees to 90 degrees.

2. The optical assembly according to claim 1 further comprising:
   a first mounting surface; and
   a second mounting surface, said off-axis cylindrical mirror element and said spherical toric mirror element being mounted on said first mounting surface and said flat mirror element and said parabolic toric mirror element being mounted on said second mounting surface.

3. The optical assembly according to claim 2 wherein said first and said second mounting surfaces are mutually parallel and are facing each to the other.

4. A method for generating an optical transmission pattern comprising the steps of:
   generating an optical pencil beam;
   reflecting said optical pencil beam from a cylindrical mirror to produce a first reflected beam;
   reflecting said first reflected beam from a spherical toric mirror to produce a second reflected beam; and
   reflecting said second reflected beam from a parabolic toric mirror to produce a conic-shell segment pattern.

5. The method according to claim 4 wherein said step of reflecting said first reflected beam further comprises:
   reflecting said first reflected beam from a flat mirror for reversing a direction of said first reflected beam.

6. The method according to claim 5 wherein said cylinder mirror is an off-axis mirror.

7. The method according to claim 5 wherein said parabolic toric and said flat mirrors are mounted on a first surface and said cylindrical and said spherical toric mirrors are mounted on a second surface, said first and second surfaces being in a facing relationship each to the other.

8. The method according to claim 7 wherein said first and second surfaces are parallel each to the other.

* * * * *